United States Patent
Kodimer et al.

(10) Patent No.: US 9,247,078 B2
(45) Date of Patent: Jan. 26, 2016

(54) ACCESSING A SERVICE CLOUD FROM A MOBILE DEVICE

(71) Applicants: Toshiba Tec Kabushiki Kaisha, Tokyo (JP); Kabushiki Kaisha Toshiba, Tokyo (JP)

(72) Inventors: Marianne Kodimer, Huntington Beach, CA (US); Brenda Daos, Mission Viejo, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/286,738

(22) Filed: May 23, 2014

(65) Prior Publication Data
US 2015/0341507 A1    Nov. 26, 2015

(51) Int. Cl.
*H04N 1/04*      (2006.01)
*H04N 1/00*      (2006.01)
*G06K 9/00*      (2006.01)

(52) U.S. Cl.
CPC ............ *H04N 1/001* (2013.01); *G06K 9/00456* (2013.01); *H04N 1/0035* (2013.01)

(58) Field of Classification Search
CPC .. H04N 1/001; H04N 1/0035; G06K 9/00456
USPC ................................ 358/1.13, 1.9, 1.14, 1.15
See application file for complete search history.

(56) References Cited

U.S. PATENT DOCUMENTS

| | | | |
|---|---|---|---|
| 2013/0342865 A1* | 12/2013 | Shekher | G06K 15/4045 358/1.14 |
| 2014/0282961 A1* | 9/2014 | Dorfman | H04L 63/0823 726/7 |
| 2015/0055182 A1* | 2/2015 | Parks | G06F 3/1204 358/1.15 |

* cited by examiner

*Primary Examiner* — Houshang Safaipour
(74) *Attorney, Agent, or Firm* — SoCal IP Law Group LLP; Jonathan Pearce; Steven C. Sereboff

(57) ABSTRACT

Apparatus and methods for providing access to a service cloud are disclosed. Login information for a user may be received from a mobile device via a network. A unique identifier may be extracted from a digital image of the unique identifier captured by the mobile device. A user interface may be provided based on the unique identifier and user permissions associated with the user.

14 Claims, 5 Drawing Sheets

ACCESSING A SERVICE CLOUD FROM A MOBILE DEVICE

BACKGROUND

1. Field

This disclosure relates to performing document processing operations using public and private data sources and output locations.

2. Description of the Related Art

A document processing device (DPD) is a device providing at least one document processing function, such as print, copy, scan and fax. A multifunction peripheral (MFP) is a type of document processing device which is an integrated device providing at least two document processing functions. Each document processing function automatically converts an input document (electronic or physical) into a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents which will be referred to by that name specifically.

In printing, a DPD automatically produces a physical document from an electronic document. In copying, a DPD automatically produces a physical document from a physical document. In scanning, a DPD automatically produces an electronic document from a physical document. In faxing, a DPD automatically transmits via fax an electronic document from an input physical document which a DPD has also scanned or from an input electronic document which a DPD has converted to a fax format.

DPDs are often incorporated into corporate or other organization's networks which also include various other workstations, servers and peripherals. A DPD may provide remote document processing services to external or network devices.

A DPD may also receive services from a "cloud", which is to say from one or more remote computing devices accessed via a network. Services received from the cloud may include, for example, maintenance services such as monitoring of a DPD operational status, monitoring the amount of consumables (e.g. paper and toner) available at a DPD, and providing configuration and software/firmware updates. Services received from the cloud may also include management services such as aggregating useage and billing information across multiple DPDs, and security services such as distribution and validation of user credentials (e.g. user identities and passwords). In some cases, such as reporting maintenance and billing information, the "service" provided by the cloud may be simply to accept, store, and aggregate information pushed up to the cloud by one or more document processing devices. Services received from the cloud may further include document services such as character recognition processing of scanned documents and remote document storage. The cloud may store information about a plurality of DPDs, such as device configuration, policies, error status, maintenance history, and other information.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
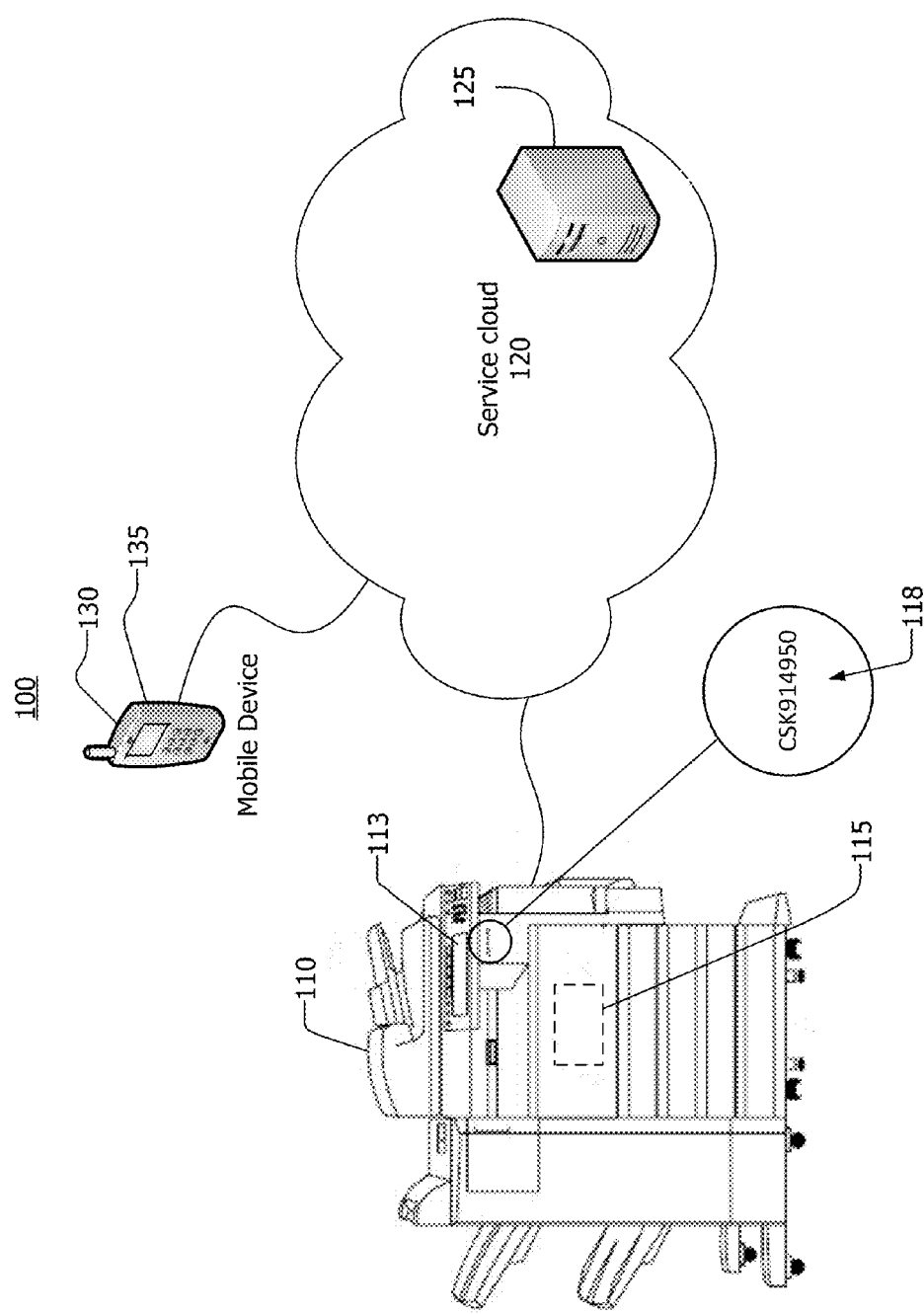
FIG. 1 is a diagram of a DPD system.

Referring now to FIG. 1 there is shown a DPD system 100. The system DPD includes a DPD 110, a service cloud 120, and a mobile device 130. The DPD 110 may be an MFP, as shown, or a single-function DPD such as a network printer or scanner. A DPD system may include more DPDs, more servers, and more mobile devices.

The DPD 110 may include a user interface subsystem 113, which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alpha-numeric keypad and/or an associated thin client through which a user may interact directly with the DPD 110.

The operation of the DPD 110 may be controlled by an embedded controller 115. The embedded controller may include a general purpose computing device and various specialized units, circuits, software and interfaces for providing the functionality and features of the DPD 110.

The DPD 110 may be assigned a unique serial number 118 at time of manufacture. The unique serial number 118 may be presented on the exterior of the DPD 110. For example, the unique serial number may be printed at one or more locations on the exterior of the DPD 110, as shown in FIG. 1, and/or may be displayed, at least some portion of the time, on the user interface subsystem 113.

The service cloud 120 may include a network and at least one server 125. The internal architecture of the service cloud 120 may be invisible and irrelevant to the DPD 110 and the mobile device 130. As previously described, the service cloud 120 may provide services to the DPD 110. The service cloud 120 may also store information about the DPD 110, such as device configuration, policies, error status, maintenance history, and other information.

The mobile device 130 may be a mobile or handheld PC, a tablet or smart phone, a feature phone, smart watch, or other similar device. The mobile device 130 may include a digital camera 135 for capturing images. In this context, "capturing an image" means converting an image of the scene into a digital data file.

In some situations, a user, such as a network administrator or service technician, may wish to access information about the DPD 110 held in the service cloud 120. Conventionally, the user may open a service application on the mobile device 130, log in to the service cloud 120, and then search for information about the DPD 110 by manually entering data such as the location, module number, and/or serial number of the DPD 110. More conveniently, the user may use the digital camera 135 of the mobile device 130 to capture an image of the serial number 118 of the DPD 110. The DPD system 100 may then automatically extract the serial number from the captured image and provide information to the user based on the extracted serial number.

Figure 2:
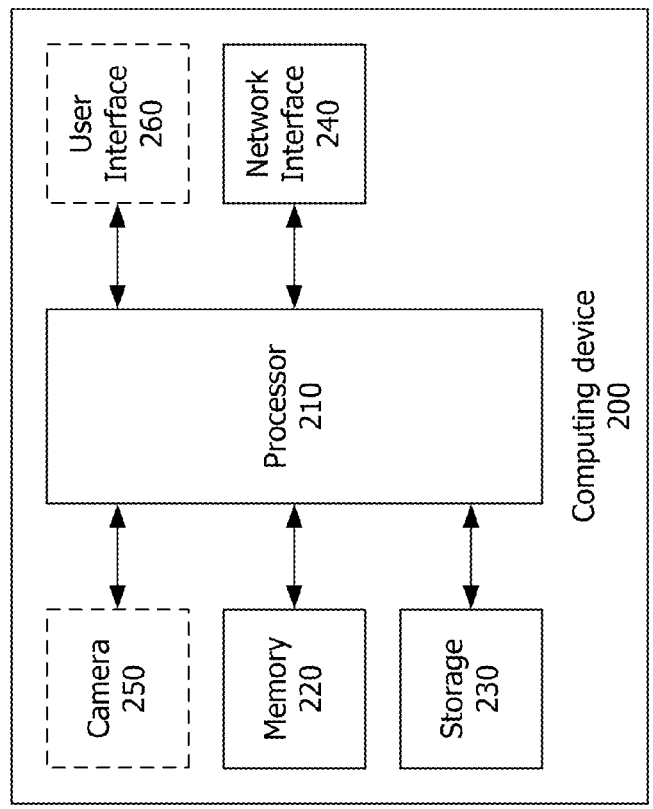
FIG. 2 is a block diagram of a computing device.

FIG. 2 shows a block diagram of a computing device 200, which is representative of the server 125, the mobile device 130, and at least a portion of the controller 115 embedded within the DPD 110. The computing device 200 may include software and/or hardware for providing functionality and features described herein.

The computing device 200 has a processor 210 coupled to a memory 220, storage 230, and a network interface 240. The processor 210 may be or include one or more processing circuit devices such as microprocessors, digital signal processors, and application specific integrated circuits (ASICs).

The memory 220 may be or include RAM, ROM, DRAM, SRAM and MRAM, and may include firmware, such as static data or fixed instructions, BIOS, system functions, configuration data, and other routines used during the operation of the computing device 200 and processor 210. The memory 220 also provides a storage area for data and instructions associated with applications and data handled by the processor 210.

The storage 230 provides non-volatile, bulk or long term storage of data or instructions in the computing device 200. The storage 230 may take the form of a disk, tape, CD, DVD, flash memory, read-only memory or other reasonably high capacity addressable or serial storage medium. Multiple storage devices may be provided or available to the computing device 200. Some of these storage devices may be external to the computing device 200, such as network storage or cloud-based storage.

The network interface 240 includes an interface to a network such as network within service cloud 120 (FIG. 1).

A mobile device, such as the mobile device 130, may also include a digital camera 250 and a user interface 260 coupled to the processor 210. The user interface 260 may include a display and one or more user input devices such as a touchscreen. The processor 210 within the controller 115 may not include a dedicated user interface 260, but may be coupled to the user interface subsystem 113 of the DPD 110.

Figure 3:
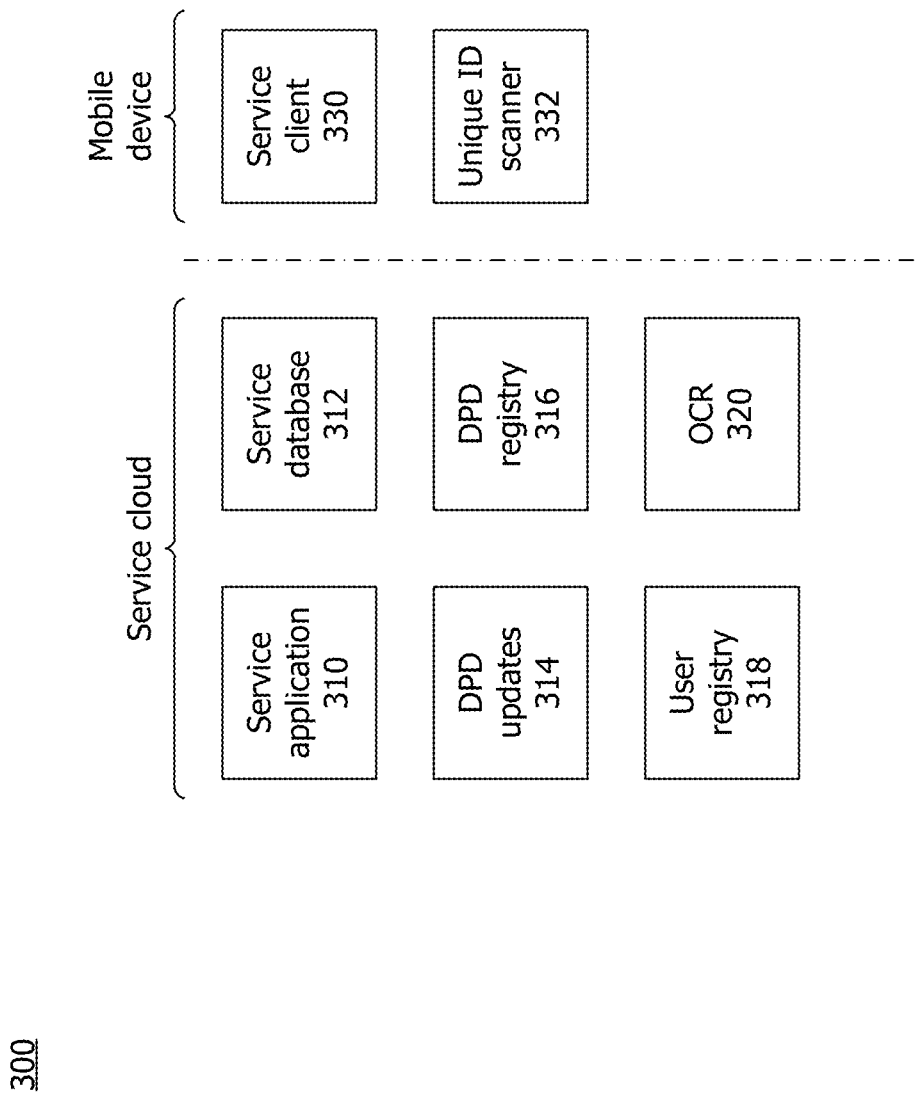
FIG. 3 is a block diagram of software for a DPD system.

FIG. 3 is a block diagram of a software system 300 included in a DPD system such as the DPD system 100. The software system 300 may include a service application 310, a service database 312, stored DPD firmware/software updates 314, a DPD registry 316, a user registry 318, and an optical character recognition (OCR) module 320 that run on one or more servers within a service cloud such as the service cloud 120. The software system 300 also may include a service client 330 and a unique identifier (ID) scanner module 332 that run on a processor within a mobile device, such as the mobile device 130. Additional software applications and modules, not shown in FIG. 3, may run on the mobile device and the service cloud. In particular, both the mobile device and the service cloud may run respective operating systems that include or have access to appropriate communications protocol stacks to allow communications between the mobile device and the service cloud.

The service application 310 may provide service to one or more DPDs as previously described. The service application may include or have access to the service database 312, which may store information about each DPD serviced by the service cloud. The information stored in the service database 312 may include, for example, service history, error status, consumable status, update history, and other information for each DPD serviced by the service cloud. The information stored in the service database 312 may be organized, stored, and retrieved based upon a unique identifier assigned to each DPD. The unique identifier may be, for example, a manufacturer's serial number or a media access control (MAC) address, or some other data that uniquely identifies each DPD.

The service application 310 may include or have access to stored DPD firmware/software updates 314. The service application 310 may push relevant updates to each DPD or may allow each DPD to pull relevant updates.

The service application 310 may include or have access to the DPD registry 316. The DPD registry 316 may list all DPDs serviced by the service cloud. The DPD registry 316 may include, for example, the unique identifier of each DPD, the model number, the physical location, the network address, information regarding the owner of the DPD, and other information.

The service application 310 may include or have access to the user registry 318. The user registry 318 may list one or more users registered to access the service application. Each user may have a unique user name and be required to login to the service application using a password or other security mechanism. Each user may be assigned a respective user role and associated permissions. Registered users may be allowed to access, monitor, and control some or all registered devices based on their user role and permissions.

The service application 310 may include or have access to the OCR module 320. The OCR module 320 may receive image data from a mobile device and extract a serial number or other unique identifier from the image data by performing an optical character recognition process. Locating the OCR module within the service cloud allows a single OCR module 320 to process images captured by a plurality of mobile devices. However, a comparable OCR module may be located in some or all mobile devices as an alternative to, or in addition to, the OCR module 320.

The service client 330 may allow a user of the mobile device to access the service application 310. The service client 330 may provide a suitable user interface on the mobile device to allow a user to login to the service cloud, identify a particular DPD, and retrieve information about the identified DPD from the service database 312.

The service client 330 may include or have access to the unique ID scanner module 332. The unique ID scanner module 332 may capture an image of a unique identifier, such as the unique identifier 118, provided on an exterior of a DPD. The image of the unique identifier may be all or a portion of an image captured by a digital camera within the mobile device.

Figure 4:
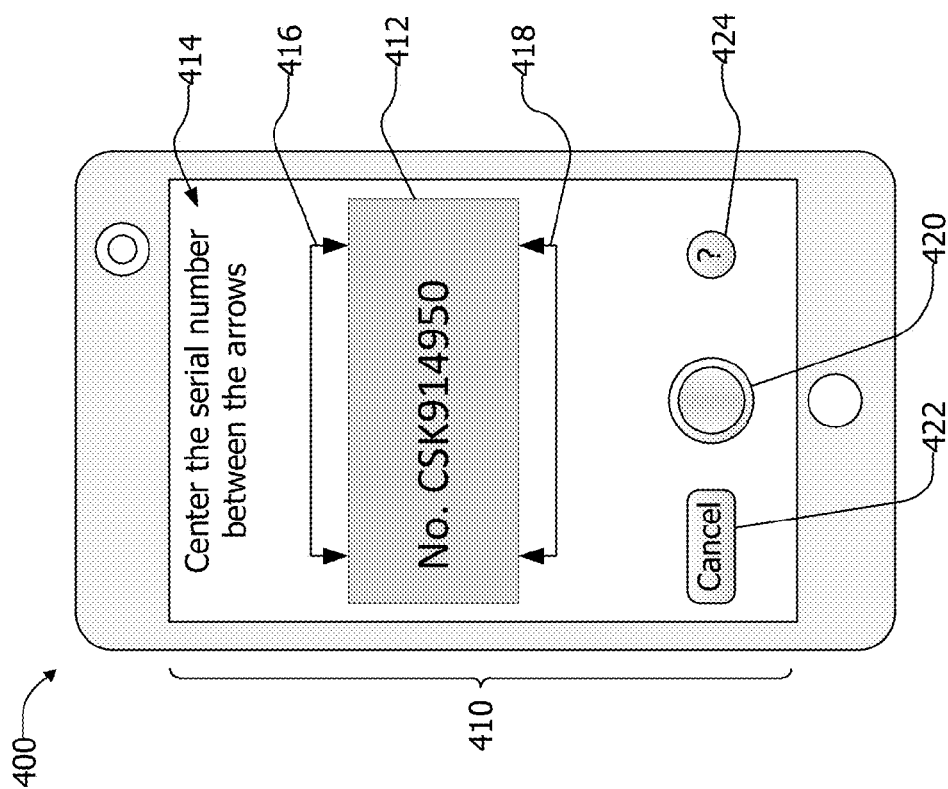
FIG. 4 is a portable device user interface for scanning a DPD serial number.

FIG. 4 is an exemplary display screen 410 on a mobile device 400. The display screen 410 may be generated by the unique ID scanner module 332 to prompt a user to capture an image of the unique identifier of a DPD. The unique identifier to be captured may be printed on an exterior surface of the DPD or displayed on a user interface of the DPD. The display screen 410 may include all or a portion 412 of an image captured by the digital camera of the mobile device 400. The display screen 410 may include instructions 414 and/or fiducial marks, such as the arrows 416, 418, to indicate where the unique identifier should be positioned in the captured image. The display screen may also include a soft trigger key 420 to trigger the camera to capture the image. To capture the image of the unique identifier, a user positions the mobile device such that the image of the unique identifier is positioned as instructed and then presses the trigger key 420. Optionally, the display screen 410 may also include other soft keys, such as a "cancel" key 422 to cancel and an inquiry key 424 to access additional instructions.

Description of Processes

Figure 5:
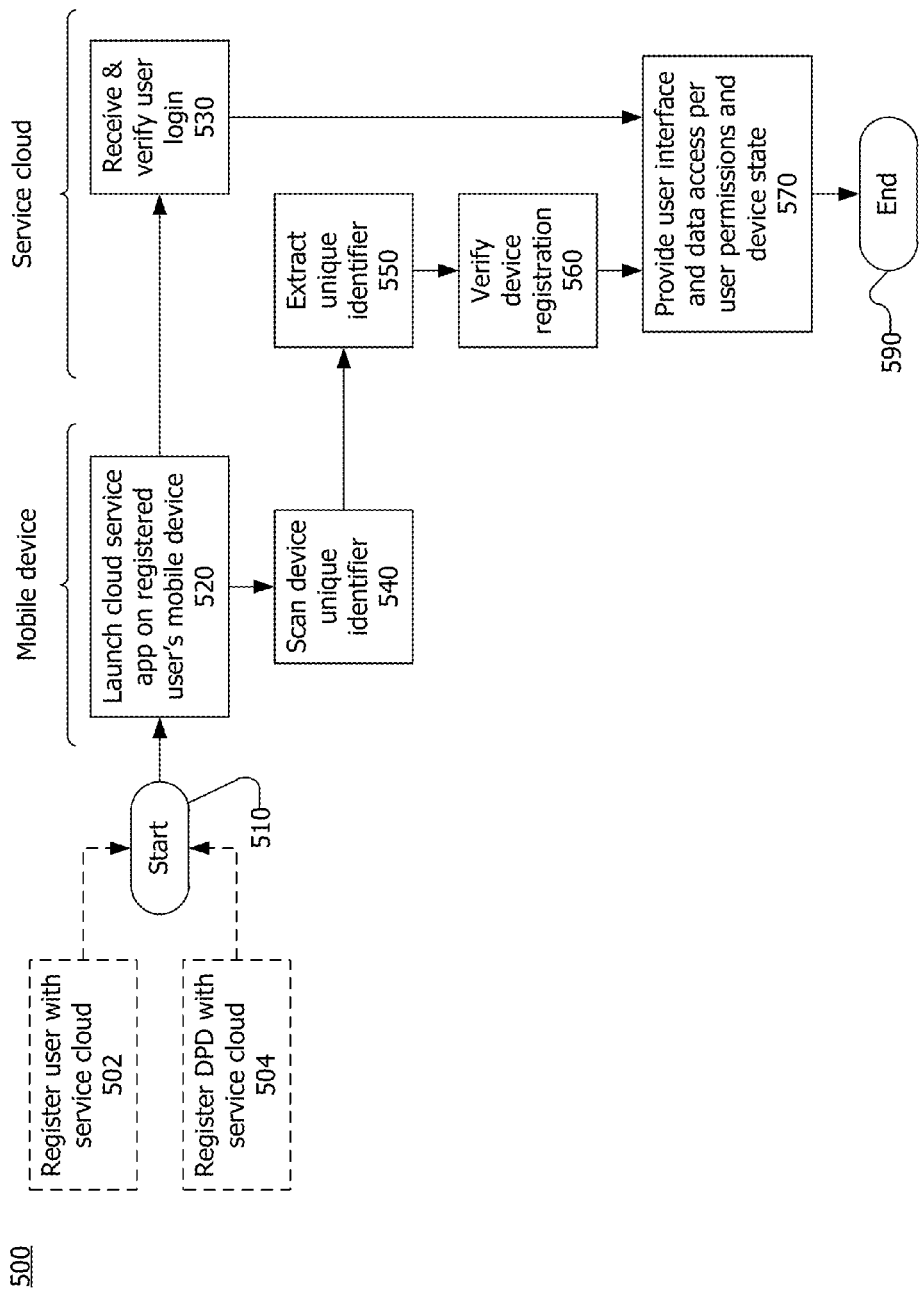
FIG. 5 is a flowchart of a process for accessing a service cloud from a mobile device.

FIG. 5 is a flowchart of a process 500 for accessing a service cloud from a user's mobile device. The process 500 may be performed in part by a user with a mobile device and in part by one or more servers within a service cloud. The process begins at start 510 and finishes at end 590. However, prior to the start of the process at 510, the user must be registered with the service cloud at 502 and at least one DPD must be registered with the service cloud at 504. Registering the user with the service cloud at 502 may include providing a user name and password or other security mechanism and sufficient information (e.g. user location, employer, job title, etc.) for the user to be assigned a user role and associated permissions. Registering a DPD with the service cloud at 504 may include providing a unique identifier of the DPD and other information such as a model number or type, location, and ownership information.

At 520, the user may launch a cloud service application ("app") on the mobile device. As part of the launch, the mobile app may receive login information, such as a user name and password, from the user and forward the login information to the service cloud. Alternatively, the mobile app may have previously stored all or part of the login information and automatically provide the stored login information to the service cloud. At 530, the service cloud may receive the login information from the mobile device and verify that the user is registered with the service cloud. If the user is not registered with the service cloud, a registration process (not shown) may be undertaken. If the user is not registered and a registration process is not undertaken, the process 500 may end (not shown). If the user is registered with the service cloud, the user's permissions (i.e. what access the user has to which DPDs) may be determined.

At 540, after verification that the user is registered with the service cloud, the user mobile device's digital camera may be used to capture an image of a unique identifier of a selected DPD. The unique identifier may be, for example, a DPD serial number printed on an exterior surface of the DPD or displayed on a user interface of the DPD. To facilitate capturing the image of the unique identifier, the mobile device may provide a display screen such as the display screen 410.

At 550, the service cloud may extract the unique identifier from the image of the unique identifier captured by the mobile device at 540. For example, the service cloud may perform optical character recognition processing on the image of the unique identifier.

At 560, the service cloud may use the extracted unique identifier to verify that the selected DPD is registered with the service cloud. If the selected DPD is not registered with the service cloud, a registration process (not shown) may be undertaken. If the DPD is not registered and a registration process is not undertaken, the process 500 may end (not shown).

If the selected DPD is registered with the service cloud, a user interface may be provided to the user at 570 in accordance with the status of the selected DPD and the user's permissions. The user interface may allow the user to access some or all information regarding the selected DPD stored in the service cloud. The user interface may allow the user to monitor the status of the selected DPD and/or control the operation of the selected DPD. The user interface may be, for example, one or more web pages generated by the service cloud and presented on the mobile device and/or a user interface of the selected DPD. Once the user has gained access to the service cloud, the process 500 may end at 590. The interaction between the user device and the service cloud may persist beyond the end of the process 500.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for providing access to a service cloud, comprising:
   receiving, from a mobile device via a network, login information for a user;
   determining the user permissions available to the user based upon the login information;
   extracting a unique identifier from a digital image of the unique identifier captured by the mobile device; and
   if the unique identifier is associated with a document processing device that is registered with the service cloud, providing a user interface for user interaction with the mobile device to control the document processing device based on the user permissions associated with the user and the document processing device.

2. The method of claim 1 wherein extracting the unique identifier further comprises:
   receiving the image of the unique identifier from the mobile device via the network; and
   performing optical character recognition processing on the image of the unique identifier to extract the unique identifier.

3. The method of claim 1 wherein the unique identifier is a serial number of the document processing device.

4. The method of claim 1, wherein the user interface provides the user access to information about the document processing device stored in the service cloud.

5. The method of claim 1, wherein the user interface permits the user to monitor and/or control the document processing device.

6. The method of claim 1, wherein providing a user interface further comprises:
   generating at least one web page for presentation on the mobile device.

7. The method of claim 1, further comprising:
after receiving the login information, determining whether or not the user is registered with the service cloud, and providing the user interface only if the user is registered.

8. A computing device, comprising:
a processor;
a network interface coupled to the processor and to a network; and
storage storing instructions that, when executed by the processor, cause the computing device to perform actions including:
receiving, from a mobile device via the network, login information for a user;
determining the user permissions available to the user based upon the login information;
extracting a unique identifier from an image of the unique identifier captured by the mobile device; and
if the unique identifier is associated with a document processing device that is registered with the service cloud, providing a user interface for user interaction with the mobile device to control the document processing device based on the user permissions associated with the user and the document processing device.

9. The computing device of claim 8 wherein extracting the unique identifier further comprises:
receiving the image of the unique identifier from the mobile device via the network; and
performing optical character recognition processing on the image of the unique identifier to extract the unique identifier.

10. The computing device of claim 8 wherein the unique identifier is a serial number of the document processing device.

11. The computing device of claim 8, wherein the user interface provides the user access to information about the document processing device stored in the service cloud.

12. The computing device of claim 8, wherein the user interface permits the user to monitor and/or control the document processing device.

13. The computing device of claim 8, wherein providing a user interface further comprises:
generating at least one web page for presentation on the mobile device; and transmitting the web page to the mobile device via the network.

14. The computing device of claim 8, the actions performed further comprising:
after receiving the login information, determining whether or not the user is registered with the service cloud, and providing the user interface only if the user is registered.

* * * * *